United States Patent [19]

Gwin et al.

[11] Patent Number: 5,585,785
[45] Date of Patent: Dec. 17, 1996

[54] DRIVER ALARM

[76] Inventors: Ronnie Gwin; Betty A. Gwin, both of HC 64 Box 270 A-1, Clifton, Tex.; Charles R. Hyde, 3813 Shady Creek, Garland, Tex. 75042

[21] Appl. No.: 398,452

[22] Filed: Mar. 3, 1995

[51] Int. Cl.⁶ ................................................. G08B 23/00
[52] U.S. Cl. ......................... 340/575; 340/576; 180/271; 180/272
[58] Field of Search .................. 340/575, 576; 180/271, 272

[56] References Cited

U.S. PATENT DOCUMENTS

| | | | |
|---|---|---|---|
| 3,946,288 | 3/1976 | Isaksson et al. | 340/576 |
| 3,999,177 | 12/1976 | Greene | 340/279 |
| 4,031,527 | 6/1977 | Yanagishima et al. | 340/279 |
| 4,104,621 | 8/1978 | Yanagishima et al. | 340/576 |
| 4,278,969 | 7/1981 | Woods | 340/576 |
| 4,361,834 | 11/1982 | King | 340/575 |
| 4,485,375 | 11/1984 | Hershberger | 340/576 |
| 4,540,979 | 9/1985 | Gerger et al. | 340/576 |
| 4,617,559 | 10/1986 | Slansky | 340/576 |
| 4,875,030 | 10/1989 | Chiu | 340/575 |
| 4,953,111 | 8/1990 | Yamamoto et al. | 364/569 |
| 5,012,226 | 4/1991 | Love | 340/576 |

Primary Examiner—John K. Peng
Assistant Examiner—Benjamin C. Lee
Attorney, Agent, or Firm—H. Dennis Kelly; Jeffrey T. Hubard; Timmons & Kelly

[57] ABSTRACT

A pressure transducer is attached along the circumference of the steering wheel of a vehicle and measures total hand grip pressure on the wheel. A control unit having a microcontroller monitors the variable pressure signal from the transducer and sounds an alarm when the pressure falls below a lower limit and when the transient behavior of the pressure signal deteriorates substantially. A display unit, attached to the steering wheel and having a number of LED's, gives a visual indication of the driver's drowsiness level.

13 Claims, 1 Drawing Sheet

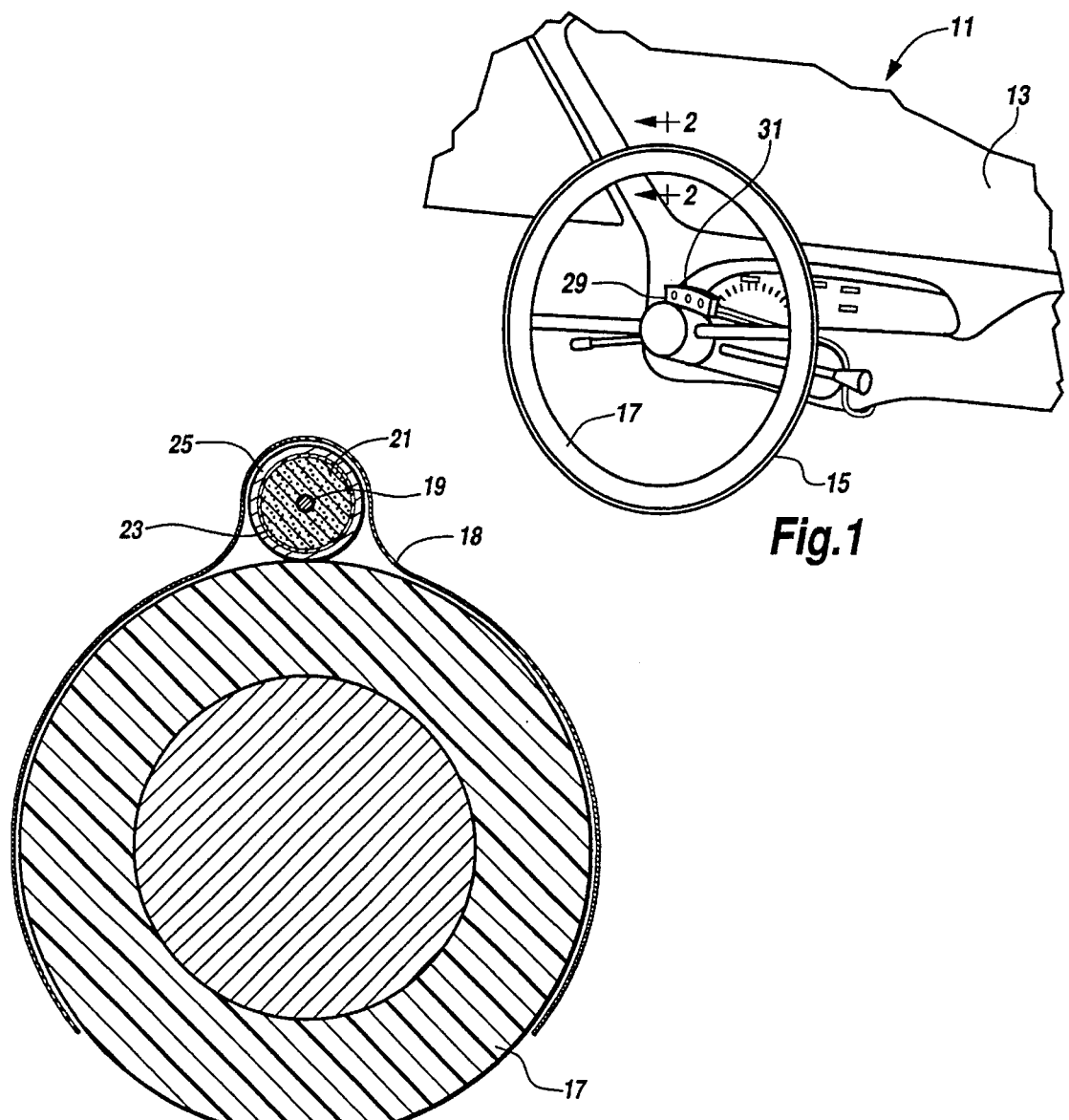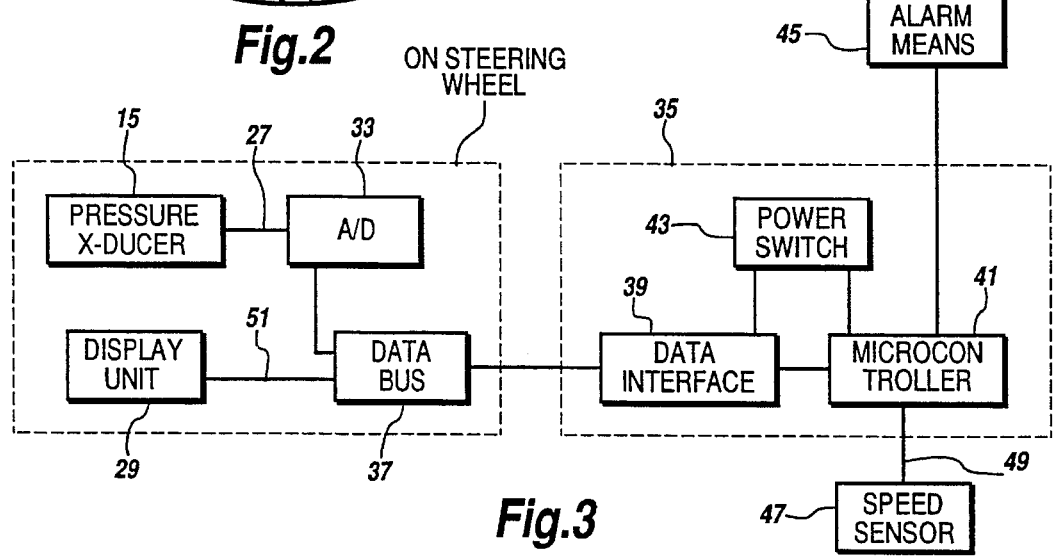

DRIVER ALARM

BACKGROUND OF THE INVENTION

1. Field of the Invention

This invention relates in general to safety devices, and in particular to driver alertness monitors that alert the driver to the onset of fatigue and drowsiness.

2. Description of the Related Art

There are many devices in existence to alert drivers when they begin to fall asleep while operating a vehicle. Some have devices that attach to the driver's head for detecting when the driver's head begins to nod. These devices can have the unintended effect of causing neck and back fatigue, because drivers tend to hold their heads rigidly to prevent accidently triggering the alarm. Also, many drivers are unwilling to inconvenience themselves with putting on and wearing the devices. Other devices monitor minute movement of the steering wheel to determine whether the driver is alert and reacting to the environment. These devices are comparatively slow to detect a hazardous condition and often give false alarms.

Another class of device requires the driver to grip a device, either fastened around the steering wheel or held in the hand. U.S. Pat. No. 4,540,979, issued to Gerger et al., on Sep. 10, 1985, discloses a structure employing an air tube fastened around the circumference of the steering wheel. The tube is capped at one end and hermetically sealed to a pressure switch at the other end. The switch operates an alarm mechanism. The wheel must be gripped with sufficient force to actuate the pressure switch and silence the alarm. This device, and others like it, can also cause driver fatigue, as many drivers will grip the switch with excessive force in order to prevent the alarm from sounding.

A need remained for a driver alarm that is unobtrusive and convenient to use. A need also remained for a driver alarm that can respond rapidly, while still being sensitive to slow changes in driving conditions. A driver alarm that adapts itself to different drivers' gripping pressures was also desired. As always, a driver alarm that is reliable and less expensive was also desired.

SUMMARY OF THE INVENTION

The general object of the invention is to alert a driver when the device determines that the driver is becoming dangerously drowsy. This object is achieved by a variable pressure transducer attached to the steering wheel on the vehicle, a control unit, a speed sensor, and an alarm mechanism. The pressure transducer produces an electrical signal corresponding to the hand grip pressure on the wheel. The control monitors this signal and determines if a hazardous condition exists. If there is a hazardous condition, the control unit activates the alarm mechanism, which can produce an audible alarm, a mechanical vibration, or any of the other responses already used in the art. A speed sensor is used to suspend operation of the alarm until the speed of the vehicle is above a preset threshold.

Other objects of the invention are that it operate with a minimum of interference to the driver, and that it should not compel the driver to grip the wheel with unusual force. These objects are achieved by use of the variable pressure transducer. Since there is no set amount of pressure that must be applied, as in the case of a switch, there is less incentive for the driver to grip the wheel excessively hard, thus preventing fatigue. The transducer is mounted on the normal gripping area on the steering wheel and does not require any change to driving style, so interference to driving is minimized.

Still another object is to adapt to the different grip pressures of different drivers. This object is also achieved by use of the variable pressure transducer. By monitoring a variable pressure signal instead of a discrete switch point, the driver alarm may be adjusted to each driver's particular grip pressure.

Another object is that the invention respond rapidly to dangerous conditions, while also having the capability to respond to a slow deterioration of driving response. This object is achieved by the way in which the control unit monitors the pressure signal. If the signal falls below a minimum threshold, the control unit rapidly activates the alarm. The control unit can also monitor the normal variations in the pressure signal that occur as an alert driver responds to driving conditions. If these variations change substantially over time, the control unit can alert the driver.

The above, as well as additional objects, features, and advantages of the invention will become apparent in the following detailed description.

BRIEF DESCRIPTION OF THE DRAWINGS

FIG. 1 is a perspective view of a driver alarm according to the invention, as it appears when installed.

FIG. 2 is a cross sectional view thereof, as seen along lines 2—2 in FIG. 1.

FIG. 3 is a block schematic view of the functional elements of the invention.

DESCRIPTION OF THE PREFERRED EMBODIMENT

FIG. 1 shows the preferred embodiment of the driver alarm 11—of the invention as installed in an automobile 13. The driver alarm 11 includes a pressure transducer 15 adapted to fit around the steering element, in this case a steering wheel 17. The transducer 15 could be designed to fit along the gripping surface of a motorcycle handlebar or other steering element as well. The transducer 15 is attached by clips 18 that do not compress the transducer 15. If the driver alarm 11 is incorporated into the vehicle as part of the original equipment, the transducer 15 could be partially inset into a channel (not shown) with integral retainers formed in the steering wheel 17.

The pressure transducer 15 is shown in cross section in FIG. 2. A center conductor 19 is surrounded by a compressible conductive foam 21. The foam 21 is made from the same material used to protect static-sensitive electronic components during transport. Surrounding the foam 21 is a flexible conductive shield 23 made in a manner known in the art for coaxial cable. A flexible, waterproof outer cover 25 protects and contains the other elements. While a coaxial configuration of the elements is shown, other configurations are possible, such as flat strip having two parallel conductors separated by a layer of the conductive foam 21.

Compressing the foam 21 causes the resistance of the foam 21 between the points of compression to decrease. The electrical resistance of the transducer 15, as measured between the center conductor 19 and the conductive shield 23, will therefore vary with the amount by which the transducer 15 is compressed. The total change in resistance will in turn depend on both the magnitude of the pressure and the percentage of the total length of the transducer 15 that is gripped. The transducer 15 will have a maximum value of resistance when the steering wheel 17 is not being gripped.

Although a transducer using a variable resistance mechanism is disclosed, other methods known in the art for developing a variable pressure signal 27, shown in FIG. 3, are also acceptable. One such method is the use of a sealed air tube as shown in the Gerger patent, in conjunction with a solid-state piezoresistive pressure transducer. Another method is the use of a coaxial cable with an easily deformable solid or foam dielectric, the varying capacitance of the cable providing the pressure signal Returning to FIG. 1, the display means for the driver alarm is a display unit 29 attached to the steering wheel 17. The unit 29 has a number of light emitting diodes (LED's) 31 that indicate the driver's level of drowsiness as determined by the driver alarm 11. The LED's 31 may be configured in a three color triad to simulate a stoplight as shown, or as a bar graph or other means as desired.

As shown in FIG. 3, the pressure signal 27 from the transducer 15 is sent to an analog-to-digital convertor (A/D) 33, which digitizes the pressure signal 31 and transmits it to a control unit 35 via a data bus 37. The data bus 37 contains circuitry that provides bidirectional serial communication between the elements on the steering wheel 17 and the control unit 35. 1he data bus 17 also provides power to the components on the steering wheel 11. When grounding is available on the steering wheel 17, then a single wire such as the 'hot' wire leading to the horn contacts (not shown) in the steering wheel 17 may be used in the data bus 37. When a single wire is used, data is impressed over the battery voltage. The direct current power and the data signal, which is alternating current, are then separated at the receiving end of the data bus 37 before being used.

The control unit 35 is the control means for the driver alarm 11 and includes a data interface 39, a microcontroller 41, and a power switch 43 that supplies power to the data interface 39 and microcontroller 41. The data interface 39 converts data from the data bus's serial format to the microcontroller's parallel format and vice versa. The alarm means 45 for the driver alarm 11 is an electroacoustic transducer such as a buzzer. The alarm means 45 may be packaged in a box with the control unit 35 for convenience or physically separate to allow installation of the alarm means 45 in a desired location.

A speed sensor 47, of the type used in cruise control devices, measures vehicle speed. The speed sensor 47 develops a speed signal 49 that is used by the microcontroller 41 to determine when to bypass activation of the alarm. The speed signal 49 is a series of pulses, compatible with the logic levels in the microcontroller 41, whose frequency is proportional to vehicle speed.

The microcontroller 41 performs several functions. It monitors the signals from the pressure transducer 15 and the speed sensor 47. It calculates the likelihood that the driver is falling asleep and activates the alarm means 45. It also creates a display signal 51, corresponding to an arbitrary scale of driver drowsiness, that is sent to the display unit 27. Drive electronics (not shown) in the display unit 29 decode the signal 51 and drive the appropriate LED's 31.

When the power switch 43 is turned on, the microcontroller 41 starts to measure the frequency of the speed signal 49, determines the vehicle speed, and compares this value to a threshold value held in a nonvolatile memory (not shown), which may be located in the microcontroller 41 itself. While the vehicle speed is less than the threshold value, the alarm means 45 is disabled. This prevents the alarm from sounding if the car is parked or in city traffic.

Upon power up, the microcontroller 41 also begins measuring the signal from the pressure transducer 15. During roughly the first fifteen seconds of operation, the microcontroller 41 keeps track of the highest and lowest measured pressure values. These values are stored in the microcontroller's 41 memory registers for reference, and represent the highest and lowest normal values of hand grip pressure. These values allow the microcontroller 41 to set a baseline of operation and allow the driver alarm 11 to adjust itself to each individual driver.

After the values are stored, the microcontroller 41 calculates an alarm point corresponding to a grip pressure at a safe margin below the lowest normal hand grip pressure value. If the hand grip pressure drops below this alarm point, the microcontroller 41 instantly activates the alarm means 45. In addition, the microcontroller 41 can monitor the transient behavior of the pressure signal 27, and determine the driver's state of drowsiness in the same manner used in the art for monitoring steering wheel oscillations. The driver alarm 11 can thus respond to slow deterioration in driving response as well as a sudden loss of hand grip pressure.

Minor refinements to operation and setup of the driver alarm 11 are necessary when the device is installed as an add-on item rather than being designed into the car as original equipment. Such things as setting the low speed threshold, and compensating for the value of the pressure signal 27 when there is no hand grip pressure, can be accomplished by means known in the art.

The driver alarm 11 of the invention has several advantages over the prior art. The driver alarm operates with a minimum of interference with normal driving. Because it adjusts to each driver's particular gripping pressure, it does not require the driver to grip the wheel in an unusual manner, thus reducing fatigue. It can respond rapidly to a sudden loss of hand grip pressure, yet still respond to slow deterioration in driving response as the driver slowly becomes drowsy.

The invention has been shown in only one embodiment. It should be apparent to those skilled in the art that the invention is not so limited, but is susceptible to various changes and modifications without departing from the spirit of the invention.

What is claimed is:

1. A driver alarm for alerting a driver of a hazardous condition of the onset of sleepiness or lack of attentiveness, wherein the driver alarm comprises:

a transducer, adapted to be attached to a steering element on a vehicle, for converting hand grip pressure on the steering element into a variable, electrical pressure signal corresponding to the hand grip pressure;

a speed sensor for detecting the vehicle's speed and creating a speed signal corresponding to the vehicle's speed;

alarm means for alerting the driver of the hazardous condition; and control means for monitoring the speed signal and the pressure signal, creating an alarm point based on the monitored speed signal and a portion of the monitored pressure signal during an initial start-up interval of each session of operation of the driver alarm, and determining that the hazardous condition occurs when the alarm point is exceeded, and activating the alarm means.

2. A driver alarm as recited in claim 1, further comprising display means for displaying the status of the control means' assessment of the existence of the hazardous condition.

3. A driver alarm as recited in claim 2, wherein the control means further comprises:
- a microcontroller for monitoring the pressure signal and speed signal and for activating the alarm means;
- a data interface for translating the pressure signal and speed signal into a form usable by the microcontroller, and for sending a display signal to the display means; and
- a power switch for supplying power to the microcontroller and the data interface.

4. A driver alarm as recited in claim 3, wherein the microcontroller will not determine that the hazardous condition exists until the vehicle's speed exceeds a threshold value.

5. A driver alarm as recited in claim 1, wherein the alarm means is an electroacoustic transducer.

6. A driver alarm for alerting a driver of a hazardous condition of the onset of sleepiness or lack of attentiveness, wherein the driver alarm comprises:
- a transducer, adapted to be attached to a steering element on a vehicle, for converting hand grip pressure on the steering element into a variable, electrical pressure signal corresponding to the hand grip pressure;
- a speed sensor for detecting the vehicle's speed and creating a speed signal corresponding to the vehicle's speed;
- an electroacoustic transducer for alerting the driver of the hazardous condition;
- a power switch;
- a microcontroller for monitoring the pressure signal and the speed signal, for creating an alarm point based on the monitored speed signal and a portion of the monitored pressure signal during an initial start-up interval of each session of operation of the driver alarm, and for activating the electroacoustic transducer when the alarm point is exceeded; and
- a data interface for translating the pressure signal and speed signal into a form usable by the microcontroller.

7. A driver alarm as recited in claim 6, further comprising a display, driven by a display signal generated by the microcontroller, for displaying the status of the microcontroller's assessment of the existence of the hazardous condition.

8. A driver alarm as recited in claim 6, wherein the microcontroller will not determine that the hazardous condition exists until the vehicle's speed exceeds a threshold value.

9. A driver alarm for alerting a driver of a hazardous condition of the onset of sleepiness or lack of attentiveness, wherein the driver alarm comprises:
- a transducer, adapted to be attached to a steering element on a vehicle, for converting hand grip pressure on the steering element into a variable, electrical pressure signal corresponding to the hand grip pressure;
- a speed sensor for detecting the vehicle's speed and creating a speed signal corresponding to the vehicle's speed;
- alarm means for alerting the driver of the hazardous condition; and
- control means for monitoring the pressure signal and the speed signal, creating an alarm point based on the monitored speed signal and a portion of the pressure signal during an initial start-up interval of each session of operation of the driver alarm, determining that the hazardous condition occurs when said alarm point is exceeded, and activating the alarm means.

10. A driver alarm as recited in claim 9, further comprising display means for displaying the status of the control means' assessment of the existence of the hazardous condition.

11. A driver alarm as recited in claim 10, wherein the control means comprises:
- a microcontroller for the monitoring of the pressure signal and speed signal and for the activating of the alarm means;
- a data interface for translating the pressure signal and speed signal into a form usable by the microcontroller, and for sending a display signal to the display means; and
- a power switch.

12. A driver alarm as recited in claim 11, wherein the microcontroller will not determine that the hazardous condition exists until the vehicle's speed exceeds a threshold value.

13. A driver alarm as recited in claim 9, wherein the alarm means is an electroacoustic transducer.

* * * * *